(12) United States Patent
Dumont et al.

(10) Patent No.: US 10,892,792 B2
(45) Date of Patent: Jan. 12, 2021

(54) PROTECTIVE DEVICE FOR AN ELECTRONIC DEVICE, IN PARTICULAR A MOBILE TELEPHONE, PROVIDED WITH A UNIT FOR DISPENSING A PRODUCT

(71) Applicant: ALBEA LE TREPORT, Le Treport (FR)

(72) Inventors: Pierre Gabriel Francis Dumont, Dargnies (FR); Mohamed Elmeguenni, Friville Escarbotin (FR); Emmanuel Huberdeau, Neuville-les-Dieppe (FR); Thomas Pruvost, Saint-Quentin-la-Motte (FR)

(73) Assignee: ALBEA LE TREPORT, Le Treport (FR)

( * ) Notice: Subject to any disclaimer, the term of this patent is extended or adjusted under 35 U.S.C. 154(b) by 0 days.

(21) Appl. No.: 16/320,863

(22) PCT Filed: Jul. 24, 2017

(86) PCT No.: PCT/EP2017/068698
§ 371 (c)(1),
(2) Date: Jan. 25, 2019

(87) PCT Pub. No.: WO2018/019797
PCT Pub. Date: Feb. 1, 2018

(65) Prior Publication Data
US 2019/0173512 A1    Jun. 6, 2019

(30) Foreign Application Priority Data
Jul. 25, 2016  (FR) ..................................... 16 57093

(51) Int. Cl.
*H04W 4/00*    (2018.01)
*H04B 1/3888*  (2015.01)
(Continued)

(52) U.S. Cl.
CPC ............ *H04B 1/3888* (2013.01); *A45C 11/00* (2013.01); *A45C 15/00* (2013.01); *A45D 34/02* (2013.01);
(Continued)

(58) Field of Classification Search
CPC ...... H04B 1/3888; H04M 1/185; H04M 1/04; A45C 11/00; A45C 2011/002; A45C 2011/003
See application file for complete search history.

(56) References Cited

U.S. PATENT DOCUMENTS 8,639,288 B1    1/2014  Friedman
2012/0218106 A1  8/2012  Zaima et al.
(Continued)

FOREIGN PATENT DOCUMENTS

| EP | 3039988 | 7/2016 | |
| GB | 2548783 A | * 10/2017 | ............. A45C 11/00 |
| KR | 101201612 | 11/2012 | |

*Primary Examiner* — Omoniyi Obayanju
(74) *Attorney, Agent, or Firm* — Steven M. Greenberg, Esq.; Shutts & Bowen LLP

(57) ABSTRACT

The invention relates to a protective device for an electronic device, in particular a mobile telephone, comprising a protective casing (2), said casing (2) being capable of being fastened to the electronic device, the device (1) comprising a unit for dispensing a product, in particular a cosmetic product, the dispensing unit being provided with a container (3) for said product and with means for actuating the dispensing of the product, the dispensing unit being mounted on the casing (2) such that the container (3) is movable with respect to the casing (2), the movement of the container (3) with respect to the casing (2) actuating the dispensing of the product.

14 Claims, 3 Drawing Sheets

Figure 7:
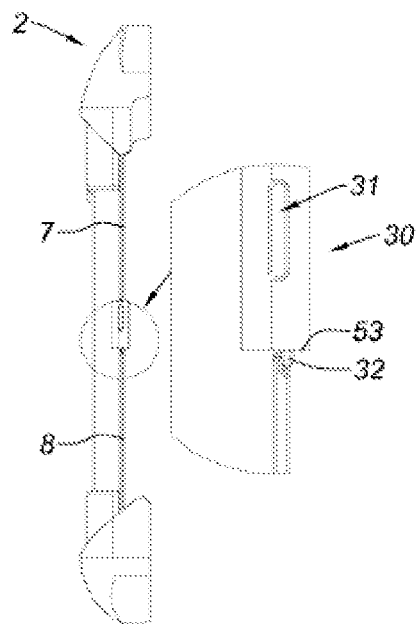

(51) Int. Cl.
    *A45D 34/02*     (2006.01)
    *A45C 11/00*     (2006.01)
    *A45C 15/00*     (2006.01)
    *H04M 1/21*     (2006.01)
    *H04M 1/18*     (2006.01)
    *A45D 34/00*     (2006.01)
    *B05B 11/00*     (2006.01)

(52) U.S. Cl.
    CPC ............. *H04M 1/185* (2013.01); *H04M 1/21* (2013.01); *A45C 2011/002* (2013.01); *A45D 2034/005* (2013.01); *A45D 2200/057* (2013.01); *B05B 11/00* (2013.01)

(56) References Cited

U.S. PATENT DOCUMENTS

| | | |
|---|---|---|
| 2014/0204513 A1 | 7/2014 | Del Padre |
| 2016/0187937 A1* | 6/2016 | Ahee ..................... G06F 1/1681 361/679.09 |
| 2016/0311566 A1 | 10/2016 | Cocaud et al. |
| 2017/0173616 A1* | 6/2017 | Rocca ..................... B05B 15/62 |

* cited by examiner

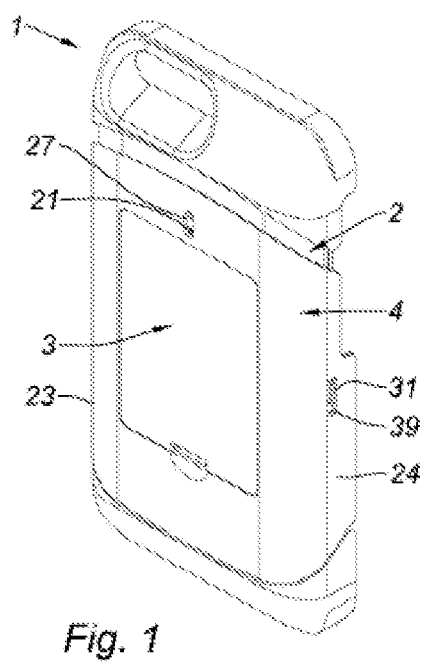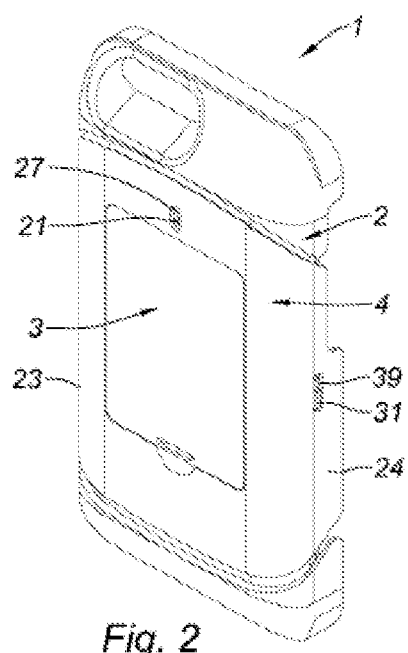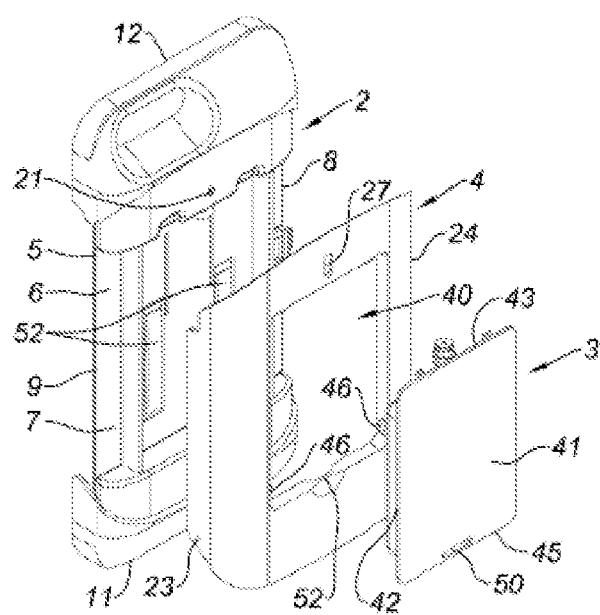

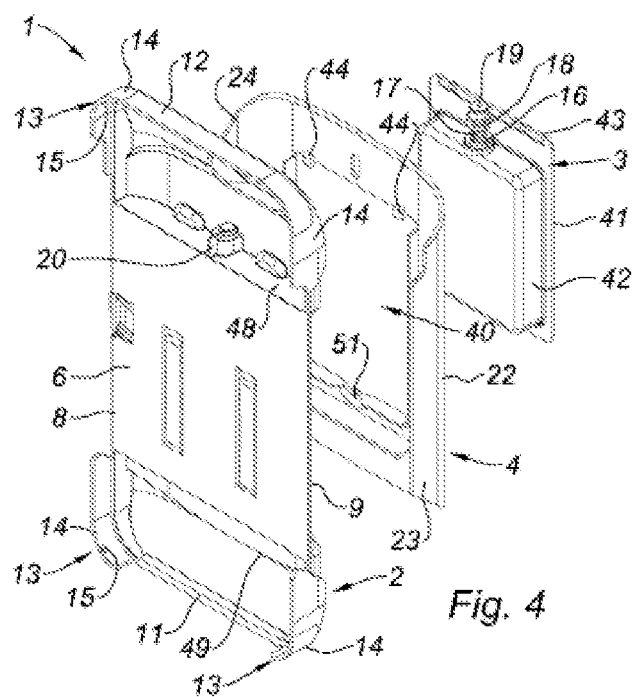
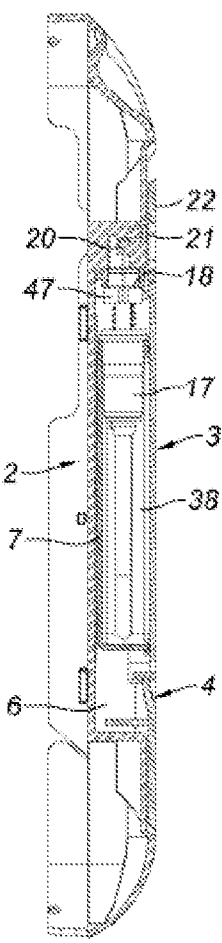
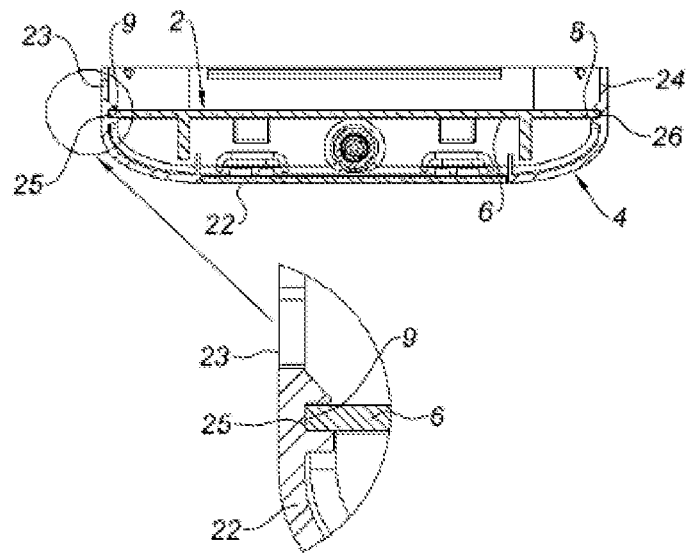
Fig. 4
Fig. 5
Fig. 6

PROTECTIVE DEVICE FOR AN ELECTRONIC DEVICE, IN PARTICULAR A MOBILE TELEPHONE, PROVIDED WITH A UNIT FOR DISPENSING A PRODUCT

CROSS-REFERENCE TO RELATED APPLICATIONS

This application is a § 371 national phase entry of International Application No. PCT/EP2017/068698, filed Jul. 24, 2017, which claims priority to French Patent Application No. 1657093, filed Jul. 25, 2016.

The invention relates to a protective device for an electronic device, provided with a unit for dispensing a product. The invention relates in particular to a protective shell for a mobile telephone provided with a bottle of cosmetic product.

In order to protect electronic devices such as mobile telephones or touch tablets, there are protective devices intended to surround them at least partially, and which have the function of preventing direct contact with the device, for example in the case it being dropped. Some protections consist in particular of casings made of a flexible material, such as rubber or leather, in order to be able to absorb impacts. In contrast, other protective devices are made from a rigid material that forms a shell, in order to act as a shield.

It is desirable to add functionality to these protective devices, in order to make them more useful. Thus, certain protective devices have for example been designed to be able to transport everyday objects. In particular, certain protective devices are configured to be able to store bottles of cosmetic product, such as perfume, or bottles of pharmaceutical product. Patent application WO 2012/156546 is known for example, which shows a protective device provided with a lateral storage pocket making it possible to insert a bottle of perfume therein.

Another document WO 2013/020591 relates to a shell comprising a removable bottle with a substantially flat shape on the rear face of the shell. The shell is configured to be able to store the bottle in a reduced thickness of the shell. Thus, the bottle can be actuated, either in the stored position on the shell, or at a distance from the shell when it is removed from the storage thereof.

However, such a system is not very easy to use, because it is required to press the actuating button of the bottle, which is not very large, while still making sure to firmly hold the unit formed by the device and the shell in order to prevent it from falling. In addition, it is difficult with such precautions, to manage to screw in a specific direction for the dispensing of the product.

The invention aims to improve the situation by avoiding the aforementioned defects, by providing a protective casing comprising a dispensing bottle which facilitates actuation.

For this, the invention relates to a protective device for an electronic device, in particular a mobile telephone, comprising a protective casing, said casing being capable of being fastened to the electronic device, the device comprising a unit for dispensing a product, in particular a cosmetic product, the dispensing unit being provided with a container for said product and with means for actuating the dispensing of the product, the dispensing unit being mounted on the casing such that the container is movable with respect to the casing, the movement of the container with respect to the casing actuating the dispensing of the product.

Thus, thanks to the invention, all that is needed, is to move the container with respect to the casing in order to trigger the dispensing of the product, without having to directly act on the dispensing unit. In this way, having to act directly on an actuator of the dispensing unit, such as a push-button for example, to actuate said dispensing is avoided.

In addition, the actuating of the device offers a novel aesthetic effect with respect to what currently exists, because in order to actuate the dispensing, a movement of the container with respect to the protective casing must be carried out.

Thus, in order to perform the dispensing of the product, when the protective device is arranged on an electronic device such as a mobile telephone, all that is needed, is to hold with one hand the casing and the electronic device, while the container is moved, for example with the other hand, in order to dispense the product. Conversely, the dispensing can also be carried out by keeping the container immobile, and by moving the casing and the electronic device with the other hand.

According to different embodiments of the invention, which can be taken together or separately:
- the protective device comprises a support structure for holding the container to the casing,
- the support structure comprises a movable cover arranged on the protective casing,
- the device comprises means for locking the movement of the support structure with respect to the casing, so as to prevent the actuation of the dispensing unit,
- the actuating means is fastened with respect to the protective casing during the actuation of the dispensing of the product,
- the casing comprises removable means for fastening the protective casing to the electronic device,
- the dispensing unit comprises a spray nozzle for the product,
- the spray nozzle for the product is arranged on the casing,
- the dispensing unit comprises a pump for suctioning the product,
- the pump is arranged on the container,
- said pump can be actuated by the actuating means,
- the actuating means comprises a push-button in order to actuate the pump,
- the push-button is arranged on the pump,
- the push-button is movable with respect to the container,
- the casing comprises a well for receiving the push-button,
- the nozzle is arranged on the well for receiving so as to receive the product coming from the dispensing orifice of the well for receiving,
- at least one of the portions of the device is made from a material of which the composition comprises Poly-Butadiene-Terephthalate, preferably mixed with Polyethylene Terephthalate,
- said structure is movably mounted on the casing in order to make it possible for the movement of the container,
- said structure is configured to be held in the hand by a user, for example between the thumb and the middle finger, the casing being configured to be able to be actuated by the index finger of the same hand,
- the casing comprises removable means for fastening the protective casing to the electronic device,
- the support structure comprises a movable cover arranged on the protective casing,
- the device comprises an interlocking space of the container,
- the device comprises means for catching the container in the interlocking space,
- the push-button is provided with an outlet orifice for the product outside of the pump,
- the container is fastened to the support structure, the container is removably fastened to the support structure, the protective casing comprises a shell, the shell is made from a rigid material, the shell comprises a main wall, the cover is substantially parallel to the main wall, the cover is moved parallel to the main wall, the main wall comprises two transversal edges, the wall comprises an inner face near which the electronic device is positioned, the edge or edges comprise the removable fastening means, the fastening means comprise corner supports formed in the corners of the edges, each corner support is configured to retain a corner of the electronic device, the corner supports are provided with lugs to retain the corners of the electronic device, the cover is intended to cover an outer face of the main wall of the shell, the cover comprises curved sides on the longitudinal edges of the main wall, the curved edges are provided with grooves configured to receive the longitudinal edges of the main face, so as to make it possible for the movement of the cover along the main wall, while still remaining secured to it, the locking means comprises a movable button arranged on the shell, the button is configured to, in a first position, block the movement of the support structure, and, in a second position, make it possible for the movement of the support structure, the button comprises an abutment and the support structure comprises a counter-abutment arranged to come into contact with one another, when the button is in the first position, the button is blocked by the counter-abutment in the first position.

Figure 8:
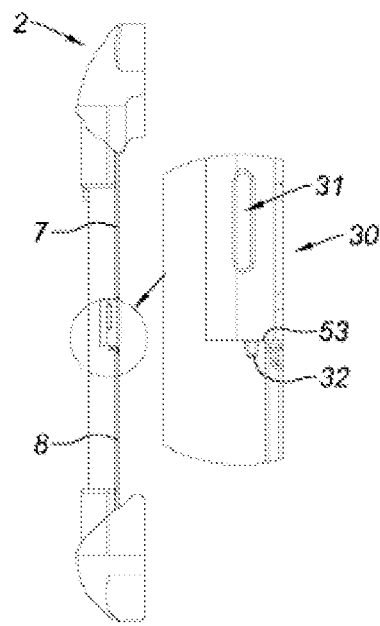
Figure 9:
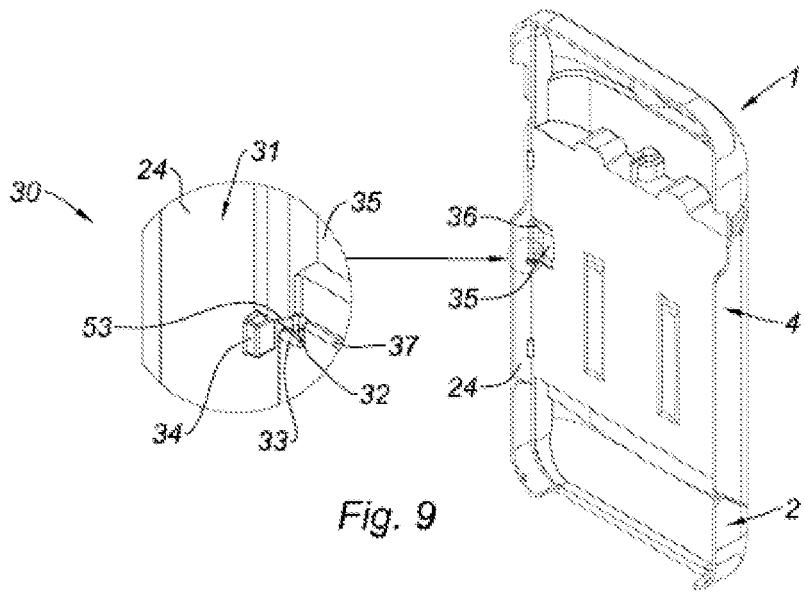

The invention will be better understood in light of the following description which is given solely for the purposes of information and which does not intend to limit it, accompanied by the attached drawings:

FIG. 1 schematically showing, a perspective view of a protective device according to an embodiment of the invention, FIG. 2 schematically showing, a perspective view of the protective device of FIG. 1, the device being shown in a configuration wherein the dispensing is actuated, FIG. 3 schematically showing, a perspective view of the protective device, of which the elements are separated, FIG. 4 schematically showing, a perspective view, according to a different angle, of the device of which the elements are separated, FIG. 5 schematically showing, a cross-sectional view of the device, and an enlarged view of a detail of this cross-sectional view, FIG. 6 schematically showing, a longitudinal cross-sectional view of the device, FIG. 7 schematically showing, a side view of the protective casing, wherein the locking means are in the locked position, and an enlarged view of the locking means, FIG. 8 schematically showing, a side view of the protective casing, wherein the locking means are in the unlocked position, and an enlarged view of the locking means, FIG. 9 schematically showing, a perspective view of the device, and an enlarged view of the locking means.

As shown in FIGS. 1 to 4, the invention relates to a protective device 1 for an electronic device, here for a mobile telephone, the device having a passage intended for the telephone. The device 1 comprises a protective casing 2 capable of being fastened to the electronic device for the purpose of protecting it in case of an impact or it being dropped. The protective casing 2 here comprises a shell, preferably made from a rigid material for optimum protection. The shell is provided with a main wall 6 that forms the bottom of the casing 2, the main wall 6 comprising two longitudinal edges 8, 9 and two transversal edges 11, 12. The wall 6 also has an inner face 5 near which the electronic device is intended to be positioned, when the casing 2 is fastened to the device, and an outer face 7 opposite the inner face 5.

In order to assemble the protection to the electronic device, the casing 2 comprises fastening means 13, which are preferably removable, so as to be able to remove the casing 2 from the electronic device, for example in order to change the battery of the device. The edges 11, 12 comprise the removable fastening means, which are here corner supports 14 formed in the corners of the edges 11, 12. Each corner support 14 is configured to retain a corner of the electronic device. For this, the corner supports 14 encircle the corners of the device and are provided with lugs 15 that retain the electronic device by hugging it.

The device 1 further comprises a unit for dispensing a product, in particular a cosmetic product. The dispensing unit in particular comprises a container 3 provided with a reservoir of said product and actuating means configured to actuate the dispensing of the product.

The container 3 is here a bottle provided with a neck 16 open on the reservoir, and with a pump 17 for suctioning the product that is located in the reservoir. The pump 17 is here a usual manual pump arranged in the reservoir of the container 3 on the neck 16. Such a pump 17 is for example formed of a piston chamber, a tube plunger arranged in the reservoir for suctioning the product, and an outlet duct which conveys the product out of the pump. The outlet duct is connected to the piston, such that the piston is actuated by the movement of the outlet duct. The pump 17 can be actuated thanks to the actuating means, which are here provided with a push-button 18 arranged on the outlet duct of the pump, and with a helical return spring for the push-button 18 arranged around the outlet duct. Thus, pressing on the push-button 18 induces the movement of the outlet duct and the actuating of the piston in the chamber, in order to extract the product that is present therein. The push-button 18 then returns to the initial position thereof using the spring.

The push-button 18 is in addition provided with an outlet orifice 19 in communication with the outlet duct in order to make it possible for the passage of the product outside the pump, from the chamber, the outlet duct, and finally through the push-button 18.

The dispensing unit also comprises a spray nozzle 20 for the product, provided with a release hole 21 towards the outside of the container and of the protective device, the hole 21 being preferably on the side opposite that of the electronic device. The nozzle 20 is in communication with the outlet orifice 19 of the push-button 18 such that the product passing through the push-button 18 is guided into the nozzle 20.

The dispensing unit is mounted on the casing 2 such that the container 3 is movable with respect to the casing 2, preferably according to a degree of freedom that corresponds to that of the actuating of the pump. In other words, the container 3 is movable along a direction of movement, the direction being preferably that according to which the push-button 18 is moved in order to actuate the pump 17. This direction is therefore preferably directed according to the outlet duct of the pump 17.

For this purpose, the protective device comprises a support structure 4 for holding the container 3 with the casing 2. The structure 4 is here movably mounted on the casing 2 in order to make it possible for the movement of the container 3. In other words, the structure 4 is secured to the container 3, and they are moved together. In the embodiment shown in the figures, preferably the support structure 4 is acted upon in order to move the container 3 with respect to the casing 2.

In the figures, the support structure 4 comprises a movable cover 22 arranged on the protective casing 2. The cover 22 covers the outer face 7 of the main wall 6 of the shell. The cover 22 is substantially parallel to the main wall 6 and can be moved parallel to the main wall 6. The cover 22 here has curved longitudinal sides 23, 24, that extend over the longitudinal edges 8, 9 of the main wall 6. The cover 22 also here comprises an opening 27 in order to make it possible for the passage of the product exiting from the nozzle 20, because in the embodiment shown, the cover 22 covers the nozzle 20 of the casing 2. According to other embodiments wherein the cover 22 does not cover the nozzle 20, such an opening is not necessary.

As shown in FIG. 5, the curved edges 23, 24 are provided with grooves 25, 26 arranged to receive the longitudinal edges 8, 9 of the main face 6. In this way, the longitudinal edges 8, 9 can slide in the grooves 25, 26 in order to make it possible for the movement of the cover 22 along the main wall 6, while remaining secured in the other directions. The cover 22 is linked to the main wall 6 of the shell using the grooves 25, 26, but can be moved with respect to the shell.

According to the invention, the device 1 is configured such that the movement of the container 3 with respect to the casing 2 actuates the dispensing of the product. For this, the actuating means are fastened with respect to the protective casing during the actuating of the dispensing, while the container 3 follows the movement of the support structure 4. In other words, the push-button 18 is movable with respect to the container 3. Thus, the support structure 4 and the reservoir of the container 3 are moved together with respect to the casing 2 in the direction of the push-button 18, the latter remaining immobile. For this, the push-button 18 is supported by the shell of the casing 2, in particular in order to prevent it from being able to be moved in the same direction as the container 3. Consequently, the push-button 18 presses on the outlet duct, such that the pump is actuated, which causes the dispensing of at least one portion of the product contained in the reservoir.

Furthermore, the container 3 is preferably removably assembled to the support structure 4. For this, the device 1 here comprises an interlocking space 38 of the container 3, such as shown in FIG. 6. The interlocking space 38 is defined between the outer face 7 of the main wall 6 of the protective casing 2 and the cover 22 of the support structure 4, which is arranged for example at a distance substantially corresponding to the width of the container, so that the latter is entirely interlocked in the space 38.

The cover 22 of the support structure 4 is in addition open at the centre thereof in order to make it possible to insert the container 3 into the space 38. This opening 40 here has dimensions that are at least equal to those of the container 3, in order to facilitate the insertion thereof.

In FIGS. 3 and 4, it is noted that the container 3 has a rectangular shape, preferably thin, in order to be able to be inserted easily into the interlocking space 38, and such that the interlocking space 38 is not excessively voluminous. The container 3 comprises a catching portion provided with a substantially flat wall 41, and a support portion 42, of substantially rectangular shape, added onto the wall 41, and which defines the volume of the reservoir of the container 3. The dimensions of the wall 41 are greater than the dimensions of the support portion 42. A first edge 43 of the wall 41 is intended to rest on first lugs 44 of the cover 22 extending in the opening 40. A second edge 45 opposite the first is intended to rest on second lugs 46 of the cover 22, that extend in the opening 40.

The device 1 in addition comprises means for catching the container 3 in the interlocking space 38. The catching means are for example a snap-fitting system, with a snap-fitting notch 50 arranged, on the one hand, on the second edge 45 of the wall 41 and a slot for receiving 51 the snap-fitting notch 50 arranged on the cover 22 at the opening 40.

The outer face 7 of the main wall 6 is here provided with at least one spring blade 52, here two as shown in FIG. 3, in order to facilitate the withdrawing of the container outside of the interlocking space 38. Thus, when the container 3 is interlocked, it pushes back the blades 52, and remains in the position using the catching means of the container 3, which oppose the force exerted by the spring blades.

In this embodiment, the dispensing unit is divided into two portions, a first portion is arranged on the protective casing 2 and a second portion on the support structure 4. On the one hand, the nozzle 20 and the release hole 21 are integrated into the protective casing 2, and on the other hand, the container 3 provided with the pump 17 and the push-button 18. Thus, when the container 3 is withdrawn from the interlocking space, the nozzle 20 and the release hole 21 are separated from the remainder of the dispensing unit.

The casing 2 in addition comprises a well 47 for receiving the push-button 18. Thus, when the container 3 is interlocked, the push-button 18 is introduced into the well 47. The well 47 is arranged under the nozzle 20 such that the product coming from the dispensing orifice 19 of the push-button 18 passes through the nozzle 20. The edges 11, 12 of the protective casing 2 each have an overhanging wall 48, 49 with respect to the main wall 6, oriented towards the outer face 7. The overhanging walls 48, 49 longitudinally delimit the interlocking space 38, and are perpendicular to the curved edges of the cover 22. The well 47 and the nozzle 20 are formed on one of the overhanging walls, outside of the interlocking space 38, the well 47 being open by this overhanging wall 48, towards the interlocking space 38.

As shown in FIGS. 7 to 9, the device 1 comprises means for locking 30 the movement of the support structure 4 with respect to the casing 2, in order to prevent the untimely actuating of the dispensing unit. The locking means 30 comprise here a movable button 31 arranged on the casing 2 and arranged on a longitudinal edge 8 of the main wall 6. The button 30 is configured to, in a first position shown in FIG. 7, block the movement of the support structure 4, and, in a second position shown in FIG. 8, make it possible for the movement of the support structure 4. Thus, the dispensing unit can be actuated, when the button 31 is in the second position.

For this purpose, the button 31 is provided with an abutment 32 that extends from the button 31, here under the button 31. The casing has an indentation 33 and the support structure 4 a counter-abutment 34 arranged on the curved side 24. The abutment 32 is configured to be inserted into the indentation 33 and be blocked by the counter-abutment 34, when the button 31 is in the first position. The button 31 is in addition articulated by a partition 35 rotatably fastened to the main wall 6 that comprises a corresponding opening 36 to allow the partition 35 to be inserted into the main wall 6. The indentation 33 is arranged on an edge 37 of the opening 36, such that the abutment 32 is blocked in the indentation 33 by the counter-abutment 34, which prevents the continuation of the rotation of the partition 35.

In the first position, a lower edge 53 of the button 31 is above the counter-abutment 34. The support structure 4 is thus blocked because the counter-abutment cannot rise due to the button 31. On the contrary, in the second position, the partition 35 is on the side of the outer face 7 of the main wall 6, and therefore is no longer in the opening 36. Thus, the abutment 32 is not in the indentation 33, and the lower edge 53 of the button 31 is not above the counter-abutment 34. The support structure 4 can therefore be moved with respect to the protective casing 2, in order to cause the dispensing of the product.

In FIGS. 1 and 2, it can be seen that the curved side 24 also has a passage 39 making it possible for access to the button 31 which is arranged between the longitudinal edge 8 of the main wall 6 of the casing 2 and the curved side 24 of the cover 22.

It is observed that said structure 4 is configured to be held in the hand by a user, for example between the thumb and the middle finger, the casing 2 being configured to be able to be actuated by the index finger of the same hand in order to trigger the dispensing of the product. According to another movement, the structure 4 is held in one hand and the user actuates the casing 2 with the other hand.

Moreover, for the manufacturing of the various portions of the protective device, a composition of material is used comprising mostly PBT (Poly-Butadiene-Terephthalate) at at least 80%, even 90% of the composition. PBT has the advantage of having good chemical resistance, resistance to impacts, a useful surface aspect, shape memory and prevents blowholes. The composition also comprises an additive, such as PET (Polyethylene Terephthalate), in proportions from 5% to 10% of the composition. A flame retardant can still be added to the composition, such as a mixture based on an organic phosphoric acid metal salt.

Parts are thus obtained of which the aspect is improved in addition to an excellent shine, as well as greater facility in being decorated and in resisting scratches. Using this composition, it is possible to produce all of the elements, i.e. the casing, the support structure and the container, in one single thermoplastic material, this in order to obtain a homogeneity in aspect between the various components, when the product is brand new as well as when it has been used.

This material ensures enhanced performance of each one of the components, such as the compatibility with perfume containing at least 80% ethanol, a low friction coefficient between two parts of the same material, compatibility with an anti-UV additive in order to stabilise the light ageing of the colours, an elasticity modulus at least equal to 2000 MPa for the shape memory, the ability to be welded using ultrasound in a sealed manner. The base material has a transparent, translucent or white colour, which facilitates decoration, for example by pad printing or screen printing, and which can in addition be metallized and galvanized.

This composition therefore makes it possible to improve the characteristics of a material of which the cost of supply and of implementation is much less than that of fluoropolymers, which are currently used for this purpose. In addition, the presence of fluorine is avoided, which is suspected to be harmful to human health.

The invention claimed is:

1. A protective device for an electronic device, in particular a mobile telephone, comprising:
   a protective casing, said casing being capable of being fastened to the electronic device,
   the device comprising a dispensing unit dispensing a product, in particular a cosmetic product,
   the dispensing unit being provided with a container for said product and with means for actuating the dispensing of the product,
   the dispensing unit being mounted on the casing such that the container is movable with respect to the casing,
   the movement together of the container with respect to the protective casing actuating the dispensing of the product
   while the means for actuating the dispensing of the product remains fixed and immobile with respect to the protective casing during the dispensing of the product occurring in consequence of the movement together of the container and the protective casing.

2. The device according to claim 1, further comprising a support structure holding the container to the casing, said structure being movably mounted on the casing in order to make it possible for the movement of the container.

3. The device according to claim 2, wherein the container is fastened to the support structure.

4. The device according to claim 3, wherein the container is removably fastened to the support structure.

5. The device according to claim 4, comprising an interlocking space of the container.

6. The device according to claim 5, comprising means for catching the container in the interlocking space.

7. The device according to claim 2, wherein the support structure comprises a movable cover arranged on the protective casing.

8. The device according to claim 2, comprising means for locking the movement of the support structure with respect to the casing, so as to prevent the actuating of the unit for dispensing the product.

9. The device according to claim 8, wherein the locking means comprise a movable button configured to, in a first position, block the movement of the support structure, and, in a second position, make it possible for the movement of the support structure with respect to the protective casing.

10. The device according to claim 1, wherein the casing-comprises removable means for fastening the protective casing to the electronic device.

11. The device according to claim 1, wherein the dispensing unit comprises a spray nozzle for the product arranged on the casing, and a pump that can be actuated by the actuating means for suctioning the product, the pump being arranged on the container.

12. The device according to claim 1, wherein the actuating means comprises a push-button arranged on the container.

13. The device according to claim 12, wherein the casing comprises a well for receiving the push-button.

14. The device according to claim 1, wherein at least one of the portions of the device is made from a material of which the composition comprises Poly-Butadiene-Terephtalate, mixed with Polyethylene Terephtalate.

* * * * *